United States Patent
Xia et al.

(10) Patent No.: US 12,480,469 B2
(45) Date of Patent: Nov. 25, 2025

(54) METHODS AND DEVICES FOR INDEPENDENTLY PITCHING OF WIND TURBINE

(71) Applicant: HUANENG GUANGXI CLEAN ENERGY CO., LTD., Guangxi (CN)

(72) Inventors: Jigang Xia, Nanning (CN); Xuekong Li, Nanning (CN); Chunliang Huang, Nanning (CN); Xu Han, Nanning (CN)

(73) Assignee: HUANENG GUANGXI CLEAN ENERGY CO., LTD., Nanning (CN)

( * ) Notice: Subject to any disclaimer, the term of this patent is extended or adjusted under 35 U.S.C. 154(b) by 0 days.

(21) Appl. No.: 19/006,168

(22) Filed: Dec. 30, 2024

(65) Prior Publication Data
US 2025/0297597 A1    Sep. 25, 2025

(30) Foreign Application Priority Data
Mar. 19, 2024   (CN) .......................... 202410308664.8

(51) Int. Cl.
*F03D 7/02* (2006.01)
*F03D 80/70* (2016.01)

(52) U.S. Cl.
CPC ........... *F03D 7/0224* (2013.01); *F03D 7/024* (2013.01); *F03D 80/709* (2023.08); *F05B 2260/74* (2013.01); *F05B 2260/79* (2013.01)

(58) Field of Classification Search
CPC ...... F03D 7/0224; F03D 7/024; F03D 80/705; F03D 80/709; F03D 1/0691; F16C 33/10; F16C 33/1025
See application file for complete search history.

(56) References Cited

U.S. PATENT DOCUMENTS

| | | | |
|---|---|---|---|
| 7,384,197 B2 * | 6/2008 | Plona ...................... | F16C 33/58 384/473 |
| 8,092,171 B2 * | 1/2012 | Wiebrock ............. | F03D 7/0224 416/155 |
| 8,308,434 B2 * | 11/2012 | Numajiri ................. | F03D 80/60 416/95 |
| 8,690,442 B2 * | 4/2014 | Baun ................... | F16C 33/6622 384/473 |
| 10,808,832 B1 * | 10/2020 | Houser ............... | F16H 57/0423 |

(Continued)

FOREIGN PATENT DOCUMENTS

| CN | 202560463 U | 11/2012 | |
|---|---|---|---|
| CN | 111322196 A * | 6/2020 | ............. F03D 13/10 |

*Primary Examiner* — Nathaniel E Wiehe
*Assistant Examiner* — Jackson N Gillenwaters
(74) *Attorney, Agent, or Firm* — PORUS IP LLC

(57) ABSTRACT

Disclosed is a method and a device for independently pitching of a wind turbine. The method includes: driving a first gear using a pitch motor, such that a second gear meshed with the first gear drives a bearing inner ring to rotate to drive a paddle of a wind turbine connected to an outer side of the bearing inner ring, the bearing inner ring being connected to a root of the paddle of the wind turbine; inflating and pressurizing, using an air pump, an airbag to discharge a lubricating fluid from an interior of the airbag through discharge holes and connecting tubes; and the lubricating fluid flowing into an annular flow chamber through connecting holes, and flowing, through seepage holes, into a rotational gap between a bearing outer ring and the bearing inner ring.

13 Claims, 6 Drawing Sheets

(56) References Cited

U.S. PATENT DOCUMENTS

| | | | |
|---|---|---|---|
| 2008/0025847 A1* | 1/2008 | Teipen | F04D 29/701 |
| | | | 416/244 R |
| 2014/0205456 A1* | 7/2014 | Pasquet | F03D 7/0224 |
| | | | 416/155 |
| 2019/0128244 A1* | 5/2019 | Abreu | F03D 80/70 |

* cited by examiner

100

```
┌─────────────────────────────────────────────┐
│ Driving a first gear using a pitch motor,   │
│ such that a second gear meshed with the     │──110
│ first gear drives a bearing inner ring to   │
│ rotate to drive a paddle of a wind turbine  │
│ connected to an outer side of the bearing   │
│ inner ring, the bearing inner ring being    │
│ connected to a root of the paddle of the    │
│ wind turbine                                │
└─────────────────────────────────────────────┘
                      │
                      ▼
┌─────────────────────────────────────────────┐
│ Inflating and pressurizing, using an air    │
│ pump, an airbag to discharge a lubricating  │──120
│ fluid from an interior of a lubricating     │
│ ball through discharge holes and            │
│ connecting tubes                            │
└─────────────────────────────────────────────┘
                      │
                      ▼
┌─────────────────────────────────────────────┐
│ The lubricating fluid flowing into an       │
│ annular flow chamber through connecting     │──130
│ holes, and flowing, through seepage holes,  │
│ into a rotational gap between a bearing     │
│ outer ring and the bearing inner ring       │
└─────────────────────────────────────────────┘
```

FIG. 1

METHODS AND DEVICES FOR INDEPENDENTLY PITCHING OF WIND TURBINE

CROSS-REFERENCE TO RELATED APPLICATIONS

This application claims priority to Chinese Patent Application No. 202410308664.8, filed on Mar. 19, 2024, the entire contents of each of which are hereby incorporated by reference.

TECHNICAL FIELD

The present disclosure relates to the field of wind power generation, and in particular, to a method and a device for independently pitching of a wind turbine.

BACKGROUND

At present, wind turbine pitch systems generally use either a hydraulic pitch mechanism or a motor-driven independent pitch mechanism. CN201220246266.0 introduces a wind turbine independent pitch control device, which includes a PLC controller, a wind turbine main control computer, a first pitch motor, a second pitch motor, a third pitch motor, and a blade azimuth sensor. A signal output of the blade azimuth sensor is electrically connected to a blade signal input of the PLC controller via a wire. A first pitch angle signal output of the PLC controller is electrically connected to a control signal input of the first pitch motor through a wire. Similarly, a second pitch angle signal output of the PLC controller is electrically connected to a control signal input of the second pitch motor, and a third pitch angle signal output is connected to a control signal input of the third pitch motor, all via wires. This setup is well-organized, allowing each blade of the wind turbine to adjust its pitch angle independently according to a specific control algorithm. This not only ensures stable power output but also effectively balances the uneven loads on the blades, the tower, and other components.

However, the wind turbine independent pitch control device is generally disposed in a hub of a wind paddle, and a change of the angle of the paddle is realized by a gear driven by the pitch motor. Because of the enclosed space inside the hub, heat dissipation of the pitch motor is poor. Meanwhile, the gear is not effectively lubricated inside the hub, resulting in increased wear and reduced service life.

Therefore, it is expected to provide a method and a device for independently pitching of a wind turbine with good lubricating performance, which reduces wear and prolongs service life.

SUMMARY

One or more embodiments of the present disclosure provide a method for independently pitching of a wind turbine, comprising: driving a first gear using a pitch motor, such that a second gear meshed with the first gear drives a bearing inner ring to rotate to drive a paddle of a wind turbine connected to an outer side of the bearing inner ring, the bearing inner ring being connected to a root of the paddle of the wind turbine; inflating and pressurizing, using an air pump, an airbag to discharge a lubricating fluid from an interior of a lubricating ball through discharge holes and connecting tubes; and the lubricating fluid flowing into an annular flow chamber through connecting holes, and flowing, through seepage holes, into a rotational gap between a bearing outer ring and the bearing inner ring.

One or more embodiments of the present disclosure provide a device for independently pitching of the wind turbine, comprising: a paddle hub, heat dissipation holes, a pitch motor, and a lubricating ball, wherein an outer side of the paddle hub is connected to a wind turbine main shaft, and the outer side of the paddle hub is connected to paddles of the wind turbine; the outer side of the paddle hub is provided with a bearing inner ring, and an outer side of the bearing inner ring is rotationally connected to a bearing outer ring, an inner side of the bearing inner ring is provided with a second gear, an inner side of the bearing outer ring is provided with connecting holes, and an interior of the bearing outer ring is provided with an annular flow chamber communicated with the connecting holes; the heat dissipation holes are opened in the outer side of the paddle hub; the pitch motor is disposed on an inner side of the paddle hub, an output shaft end of the pitch motor is connected to a first gear, and the first gear meshes in an inner gear ring of the second gear; and the lubricating ball is disposed on the inner side of the paddle hub, and an outer wall of the lubricating ball is connected to an air pump, an airbag is disposed on an interior of the lubricating ball, the airbag is connected to the air pump, and the interior of the lubricating ball is filled with a lubricating fluid, and the lubricating ball is connected to the connecting holes through an outer end of connecting tubes.

BRIEF DESCRIPTION OF THE DRAWINGS

In order to more clearly illustrate the technical solutions of the embodiments of the present disclosure, the accompanying drawings of the embodiments will be briefly described below, and it will be apparent that the accompanying drawings in the following description relate only to some embodiments of the present disclosure and are not intended to be a limitation of the present disclosure.

FIG. 1 is a flowchart illustrating an exemplary process for independently pitching of a wind turbine according to some embodiments of the present disclosure;

Figure 2:
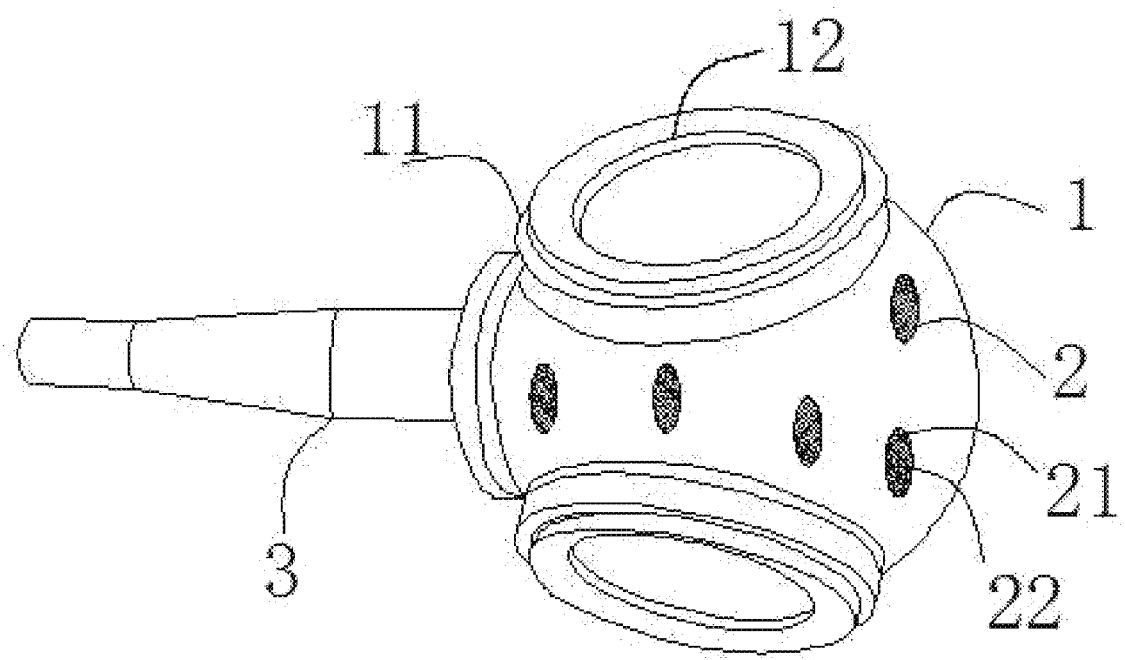
FIG. 2 is a schematic diagram illustrating an exterior structure of a device for independently pitching of the wind turbine according to some embodiments of the present disclosure.

Description of markings in the figures: 1, paddle hub; 11, bearing outer ring; 111, annular flow chamber; 112, connecting holes; 113, seepage holes; 12, bearing inner ring; 121, second gear; 2, heat dissipation holes; 21, dust-proof net; 22, waterproof breathable membrane; 3, wind turbine main shaft; 4, pitch motor; 41, fixing bracket; 42, first gear; 5, lubricating ball; 51, connecting tubes; 52, air pump; 53, fixing rod; 54, airbag; 55, discharge holes; 21-1, inner dust-proof net; 21-2, outer dust-proof net.

DETAILED DESCRIPTION

In order to make the purpose, technical solutions and advantages of the embodiments of the present disclosure clearer, the technical solutions of the embodiments of the present disclosure will be clearly and completely described below in conjunction with the accompanying drawings of the embodiments of the present disclosure. Obviously, the described embodiments are a part of the embodiments of the present disclosure, and not all of the embodiments. Based on the described embodiments of the present disclosure, all other embodiments obtained by a person of ordinary skill in the art without the need for creative labor fall within the scope of protection of the present disclosure.

A flowchart is used in the present disclosure to illustrate operations performed by a system according to embodiments of the present disclosure. It should be appreciated that the preceding or following operations are not necessarily performed in an exact sequence. Instead, steps can be processed in reverse order or simultaneously. It is also possible to add other operations to these processes, or to remove a step or steps from them.

The present disclosure is further described below in connection with the accompanying drawings and embodiments.

Embodiments of the present disclosure provide a method for independently pitching of a wind turbine with good lubricating performance to solve the problem that the current control device for independently pitching of the wind turbine has a poor heat dissipation effect of a pitch motor, which does not facilitate lubricating of the internal drive gears. The method provided in the present disclosure intended to achieve lubricating and cooling, thereby reducing wear and extending service life.

FIG. 1 is a flowchart illustrating an exemplary process for independently pitching of a wind turbine according to some embodiments of the present disclosure. In some embodiments, process 100 may be performed by a device for independently pitching of a wind turbine. As shown in FIG. 1, process 100 includes the following steps.

Step 110, driving a first gear using a pitch motor, such that a second gear meshed with the first gear drives a bearing inner ring to rotate to drive a paddle of a wind turbine connected to an outer side of the bearing inner ring, the bearing inner ring being connected to a root of the paddle of the wind turbine.

The pitch motor is a key component in the wind turbine, which controls the operating power of the wind turbine by adjusting angles of paddles of the wind turbine to ensure that the wind turbine can operate efficiently and stably under different wind speed conditions. In some embodiments, when the wind drives the paddles to rotate, the pitch motor converts a high-speed rotation to a low-speed rotation through a reduction gearbox and connects with the paddles through a gear to drive the paddles to rotate, thereby adjusting the angles of the paddles. The adjustment optimizes efficiency of wind energy utilization and increases an output power and economic efficiency of the wind turbine. In some embodiments, a size and model of the pitch motor may be set according to the actual demand.

The first gear is a gear that is connected to the pitch motor. The first gear may also be referred to as a pinion gear.

The second gear is a gear that meshes with the first gear and the bearing inner ring. The second gear is toothed to the first gear, and thus when the first gear rotates, the second gear rotates at the same time and drives the bearing inner ring to rotate. The second gear may also be referred to as a large gear. In some embodiments, an inner side of the bearing inner ring is provided with the second gear, more information can be found in the related description of FIG. 3.

In some embodiments, a diameter of the second gear is larger than a diameter of the first gear.

The outer side of the bearing inner ring is a side of the bearing inner ring that is close to the paddle hub. More information about the paddle hub can be found in the related description of FIG. 2.

In some embodiments, the bearing inner ring is connected to the root of the paddle of the wind turbine in a variety of ways. In some embodiments, the bearing inner ring is connected to the root of the paddle of the wind turbine through screw holes and bolts, or by other means. In some embodiments, the bearing inner ring is fixedly connected to the root of the paddle of the wind turbine, or by other means.

In some embodiments, the independently pitching of the wind turbine can be realized by connecting the bearing inner ring to the root of the paddle of the wind turbine.

Step 120, inflating and pressurizing, using an air pump, an airbag to discharge a lubricating fluid from an interior of a lubricating ball through discharge holes and connecting tubes.

In some embodiments, the air pump may also be a miniature air pump. The miniature air pump is a type of gas conveying device that is compact in size, has a gaseous working medium, and is mainly used for a variety of purposes such as gas sampling, gas circulating, vacuum adsorption, vacuum holding, pumping, and pressurizing. More descriptions about the air pump and the lubricating ball can be found in the related descriptions of FIG. 4 and FIG. 5.

In some embodiments, the lubricating fluid may be a solid oil, a liquid oil, or the like. The lubricating fluid may also be referred to as a lubricating oil.

The discharge holes are structures used to discharge the lubricating fluid inside the lubricating ball. A size and count of the discharge holes may be preset according to the actual demand.

The connecting tubes are connected to the discharge holes. Two ends of the connecting tubes are referred to as an inner end of the connecting tubes and an outer end of the connecting tubes, respectively. The lubricating fluid discharged from the interior of the lubricating ball flows into the inner end of the connecting tubes through the discharge holes.

In some embodiments, the device for independently pitching of the wind turbine uses the air pump to inflate and pressurize the airbag, which causes the airbag to increase in volume inside the lubricating ball, which in turn discharges the lubricating fluid inside the lubricating ball from the discharge holes and the connecting tubes. More description about the discharge holes and the connecting tubes can be found in the related description of FIG. 5.

In some embodiments, discharging the lubricating fluid inside the lubricating ball from the discharge holes and the connecting tubes facilitates the subsequent realization of lubricating and cooling of the bearings, which reduces the wear and tear of the device to prolong the service life.

Step 130, the lubricating fluid flowing into an annular flow chamber through connecting holes, and flowing, through seepage holes, into a rotational gap between a bearing outer ring and the bearing inner ring.

In some embodiments, the connecting holes are connected to the outer end of the connecting tubes. An inner side of the bearing outer ring is provided with the connecting holes, and more information can be seen in the related description of FIG. 4.

The annular flow chamber is an annular structure for the lubricating fluid to flow. The annular flow chamber is located in an interior of the bearing outer ring, and more information can be seen in the related description of FIG. 4.

The seepage holes are aperture structures that allow the lubricating fluid to flow from the annular flow chamber to a region (e.g., the rotational gap) between the bearing outer ring and the bearing inner ring. In some embodiments, the count of the seepage holes may be set according to the actual demand, for example, 1, 2, etc. In some embodiments, an inner side of the annular flow chamber is provided with the seepage holes, and more information can be found in the related description of FIG. 4.

In some embodiments, the lubricating fluid enters the annular flow chamber through the connecting holes, which in turn enters the rotational gap between the bearing outer ring and the bearing inner ring through the seepage holes.

In some embodiments, dissipating heat generated by the pitch motor through a dust-proof net and a waterproof breathable membrane included in heat dissipation holes.

The heat dissipation holes are holes opened in paddle hubs to help dissipate heat. The heat generated internally is expelled through the flow of air, thus lowering the internal temperature and preventing damage or loss of efficiency due to overheating. The heat dissipation holes may also be referred to as heat dissipation hole blocks. More description about the paddle hub can be found in the related description of FIG. 2.

The dust-proof net is used to filter dust that enters an interior of a generator, preventing the dust from entering the interior of the generator and affecting its normal operation. The dust-proof net is usually made of heat-resistant grade ABS resin, nylon fiber synthetic resin, etc., which is waterproof, heat-resistant, and corrosion-resistant. In some embodiments, the dust-proof net in the wind turbine is installed at the heat dissipation holes to ensure that cold air can enter the interior of the generator to dissipate the heat while blocking dust from entering.

The waterproof breathable membrane is a material with a microporous structure that allows air to pass through it freely, helping to dissipate heat from the wind turbine while preventing moisture from entering. The waterproof breathable membrane allows the air to be discharged when the internal pressure of the wind turbine increases, thus preventing the internal pressure of the wind turbine from becoming too high, which protects the wind turbine from internal pressure and prolongs its service life.

More descriptions about the heat dissipation holes, the dust-proof net, and the waterproof breathable membrane can be found in the related descriptions of FIG. 2.

In some embodiments of the present disclosure, the heat generated by the pitch motor is promptly exported through the dust-proof net and the waterproof breathable membrane included in the heat dissipation holes, while preventing the rainwater or the like from entering the paddle hub, thereby preventing an adverse effect on the electrical equipment in the paddle motor.

Figure 3:
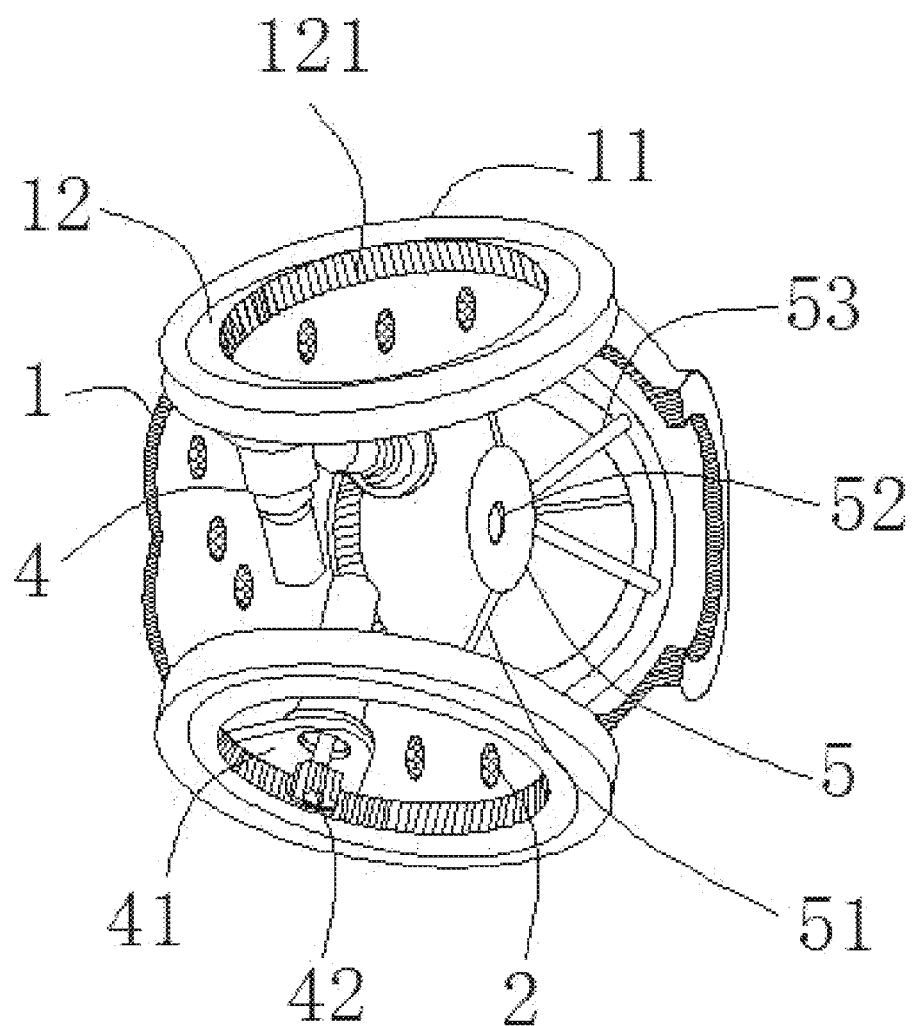
FIG. 3 is a schematic diagram illustrating an internal structure of a paddle hub according to some embodiments of the present disclosure.

FIG. 2 is a schematic diagram illustrating an exterior structure of a device for independently pitching of a wind turbine according to some embodiments of the present disclosure. FIG. 3 is a schematic diagram illustrating an internal structure of a paddle hub according to some embodiments of the present disclosure.

In some embodiments, as shown in FIG. 2 and FIG. 3, a device for independently pitching of the wind turbine includes: a paddle hub 1, heat dissipation holes 2, a pitch motor 4, a lubricating ball 5, or the like. An outer wall of the paddle hub 1 is connected to a wind turbine main shaft 3, and an outer side of the paddle hub 1 is connected to paddles of the wind turbine.

The paddle hub is a pivotal part that connects the root of the paddle hub to the wind turbine main shaft. The main function of the paddle hub is to transfer the wind, torque, bending moment, and other loads on the paddle to a drive system and ultimately to a generator, so as to realize the conversion of wind energy to mechanical energy to electrical energy. In some embodiments, the paddle hub may be manufactured from a high-strength material, such as cast steel or ductile iron, to ensure its strength and reliability under complex loads.

In some embodiments, an outer side of the paddle hub may also be referred to as the outer wall of the paddle hub.

In some embodiments, as shown in FIG. 2, the heat dissipation holes 2 are opened at the outer wall of the paddle hub 1, and an interior of each of the heat dissipation holes 2 is provided with a dust-proof net 21. More description about the dust-proof net can be found in the related description of FIG. 1.

Figure 6:
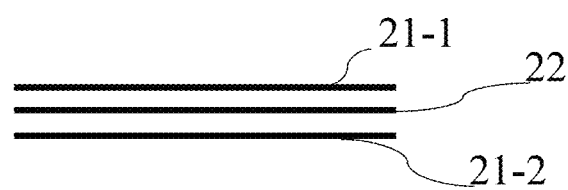
FIG. 6 is a schematic diagram illustrating a layer structure of a dust-proof net and a waterproof breathable membrane according to some embodiments of the present disclosure.

In some embodiments, the dust-proof net 21 is provided with inner and outer layers, and a waterproof breathable membrane 22 is disposed between the inner and outer layers of the dust-proof net 21. FIG. 6 is a schematic diagram illustrating a layer structure of a dust-proof net and a waterproof breathable membrane according to some embodiments of the present disclosure. As shown in FIG. 6, the dust-proof net 21 includes an inner dust-proof net 21-1 and an outer dust-proof net 21-2, and the waterproof breathable membrane 22 is disposed between the inner dust-proof net 21-1 and the outer dust-proof net 21-2.

In some embodiments, the waterproof breathable membrane 22 is of a variety of materials. In some embodiments, the waterproof breathable membrane 22 is a polypropylene material, or the like.

In some embodiments, the protection of the waterproof breathable membrane 22 is realized by providing a double-layered dust-proof net 21 made of metal. The waterproof breathable membrane 22 made of polypropylene realizes a waterproof effect on the one hand, and a breathable heat dissipation effect on the other hand. In some embodiments, the paddle hub 1, the heat dissipation holes 2, the pitch motor 4, and the lubricating ball 5 constitute a main structure of the device for independently pitching of the wind turbine.

In some embodiments, the pitch motor 4 is disposed on the inner side of the paddle hub 1, and an output shaft end of the pitch motor 4 is connected to a first gear 42, and the first gear 42 meshes in an inner gear ring of a second gear 121.

In some embodiments, the pitch motor 4 is disposed on the inner side of the paddle hub 1. In some embodiments, the pitch motor 4 is disposed on the inner side of the paddle hub 1 in a variety of ways. In some embodiments, the pitch motor 4 is fixedly connected to the inner side of the paddle hub 1.

Figure 4:
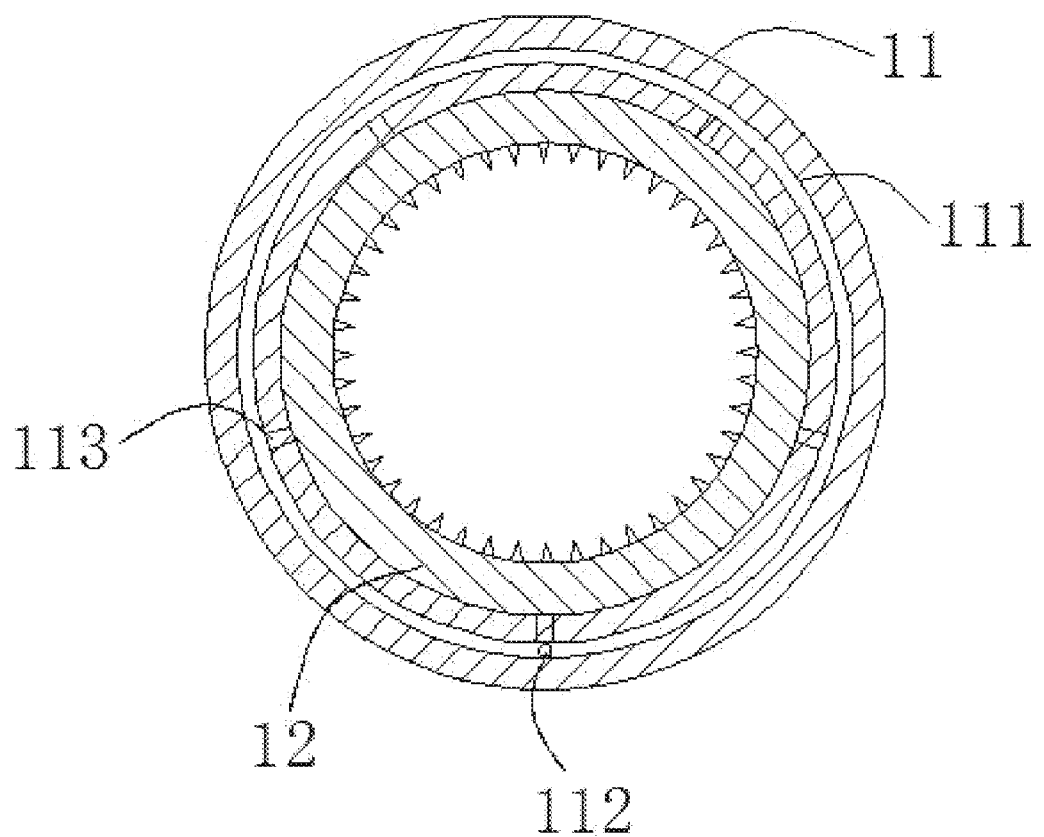
FIG. 4 is a schematic diagram illustrating sectional structures of a bearing inner ring and a bearing outer ring according to some embodiments of the present disclosure.

The output shaft end of the pitch motor 4 is a rotating portion of the pitch motor 4, which is coaxially connected to the first gear. As shown in FIG. 4, the first gear includes an inner gear ring and an outer gear ring. The output shaft end of the pitch motor 4 is coaxially connected to the inner gear ring of the first gear.

In some embodiments, an inner side of a bearing inner ring 12 is provided with the second gear 121, the second gear includes only the inner gear ring, and gears of the outer gear ring of the first gear 42 mesh with gears of the inner gear ring of the second gear 121.

In some embodiments, the torque of the pitch motor 4 is transmitted to the bearing inner ring through the first gear and the second gear in turn, so that the bearing inner ring drives the paddle of the wind turbine to rotate, realizing the control of the pitch.

In some embodiments, the pitch motor 4 is connected to the inner side of the paddle hub 1 through a fixing bracket 41.

In some embodiments, the pitch motor 4 is connected to the inner side of the paddle hub 1 in a variety of ways. In some embodiments, the pitch motor 4 is attached to the inner side of the paddle hub 1 through the fixing bracket 41, or the like.

In some embodiments, the device for independently pitching of the wind turbine includes a plurality of sets of pitch motors and second gears that are correspondingly connected with each other. The count of sets is the same as the count of the paddles of the wind turbine. The count of paddles of the wind turbine may be set according to the actual demand. In some embodiments, the device for independently pitching of the wind turbine includes three sets of pitch motors and second gears that are correspondingly connected with each other, as shown in FIG. 3. In some embodiments, the device for independently pitching of the wind turbine includes one set, or two sets, or four sets, or the like, of pitch motors and second gears that are correspondingly connected with each other.

In some embodiments, as shown in FIG. 2, the outer wall of the paddle hub 1 is provided with the bearing inner ring 12, and an outer side of the bearing inner ring 12 is rotationally connected to a bearing outer ring 11, and an inner side of the bearing inner ring 12 is provided the second gear 121.

As shown in FIG. 2, the height of the bearing inner ring 12 is higher than the height of the bearing outer ring 11, and an outer side of the lower portion of the bearing inner ring 12 is rotatably connected to the bearing outer ring 11.

In some embodiments, the bearing outer ring 11 is connected to the outer wall of the paddle hub 1 in a variety of ways. In some embodiments, the bearing outer ring 11 is fixedly connected to the outer wall of the paddle hub 1, or by other means.

In some embodiments, the second gear 121 is provided as a one-piece structure with the bearing inner ring 12, and the paddles of the wind turbine are attached to the outer side of the bearing inner ring 12 by the bolts and the screw holes, or the like.

In some embodiments, the paddles of the wind turbine are fixed to the outer side of the upper portion of the bearing inner ring 12 by the bolts and the screw holes.

In some embodiments, the first gear 42 and the second gear 121 rotate while also revolving along with the paddle hub 1.

In some embodiments of the present disclosure, the pitch motor is utilized to drive the first gear, such that the second gear meshed with the first gear to drive the bearing inner ring to rotate, which in turn drives the paddles of the wind turbine connected to the outer side of the bearing inner ring, and the bearing inner ring is fixedly connected to the root of the paddle of the wind turbine, realizing the independent pitch effect of the wind turbine. Synchronized pitching can also be achieved when a plurality of sets of pitch motors and second gears that are correspondingly connected with each other are synchronized.

In some embodiments, the lubricating ball 5 is disposed on the inner side of the paddle hub 1, and the lubricating ball 5 is connected to the connecting holes 112 through an outer end of the connecting tubes 51. The lubricating fluid in the lubricating ball 5 flows through the connecting holes 112 into an annular flow chamber 111 of the bearing outer ring 11.

The lubricating ball acts as a good lubricant to prolong the service life of the bearings and ensure stable operation of the equipment. In some embodiments, the lubricating ball being of various shapes. In some embodiments, the lubricating ball 5 is an oval structure. More description about the lubricating ball 5 can be found in the related description of FIG. 5.

In some embodiments, the lubricating ball 5 may be connected to the inner side of the paddle hub 1 in a variety of ways.

In some embodiments, the lubricating ball 5 is connected to the inner side of the paddle hub 1 through a fixing rod 53.

In some embodiments, the lubricating ball 5 is staggered in position with the pitch motor 4. The lubricating ball 5 and the pitch motor 4 are located inside the device for independently pitching, so to prevent frictional contact between the lubricating ball 5 and the pitch motor 4, the positions of the lubricating ball 5 and the pitch motor 4 need to be staggered.

FIG. 4 is a schematic diagram illustrating sectional structures of a bearing inner ring and a bearing outer ring according to some embodiments of the present disclosure.

In some embodiments, as shown in FIG. 4, an inner side of the bearing outer ring is provided with the connecting holes 112, and the interior of the bearing outer ring 11 is provided with the annular flow chamber 111 communicated with the connecting holes 112.

The inner side of the bearing outer ring is a side of the bearing outer ring that is close to the bearing inner ring. The outer side of the bearing outer ring is a side of the bearing outer ring that is away from the bearing inner ring. The interior of the bearing outer ring is a part of the bearing outer ring that is between the outer side and the inner side.

In some embodiments, the bearing outer ring 11 is connected to the outer wall of the paddle hub 1, and the interior of the bearing outer ring 11 is provided with seepage holes 113 located on an inner side of the annular flow chamber 111, and the seepage holes 113 is communicated with the annular flow chamber 111.

The inner side of the annular flow chamber is a side of the annular flow chamber that is close to the bearing inner ring.

In some embodiments, the bearing outer ring 11 may be connected to the outer wall of the paddle hub 1 in a variety of ways. In some embodiments, the bearing outer ring 11 may be fixedly connected to the outer wall of the paddle hub 1, or by other means.

In some embodiments, the connecting holes 112 are disposed on a side of the bearing outer ring 11 toward a center of the paddle hub 1, and the bearing outer ring 11 maintains only the revolution with the paddle hub 1.

In some embodiments, by providing the annular flow chamber 111, the lubricating fluid can flow in the annular flow chamber 111 and flow into the rotational gap between the bearing outer ring and the bearing inner ring through the seepage holes 113, making it convenient to realize uniform lubricating and temperature reduction effects on gaps when the bearing outer ring 11 and the bearing inner ring 12 are rotationally connected.

Figure 5:
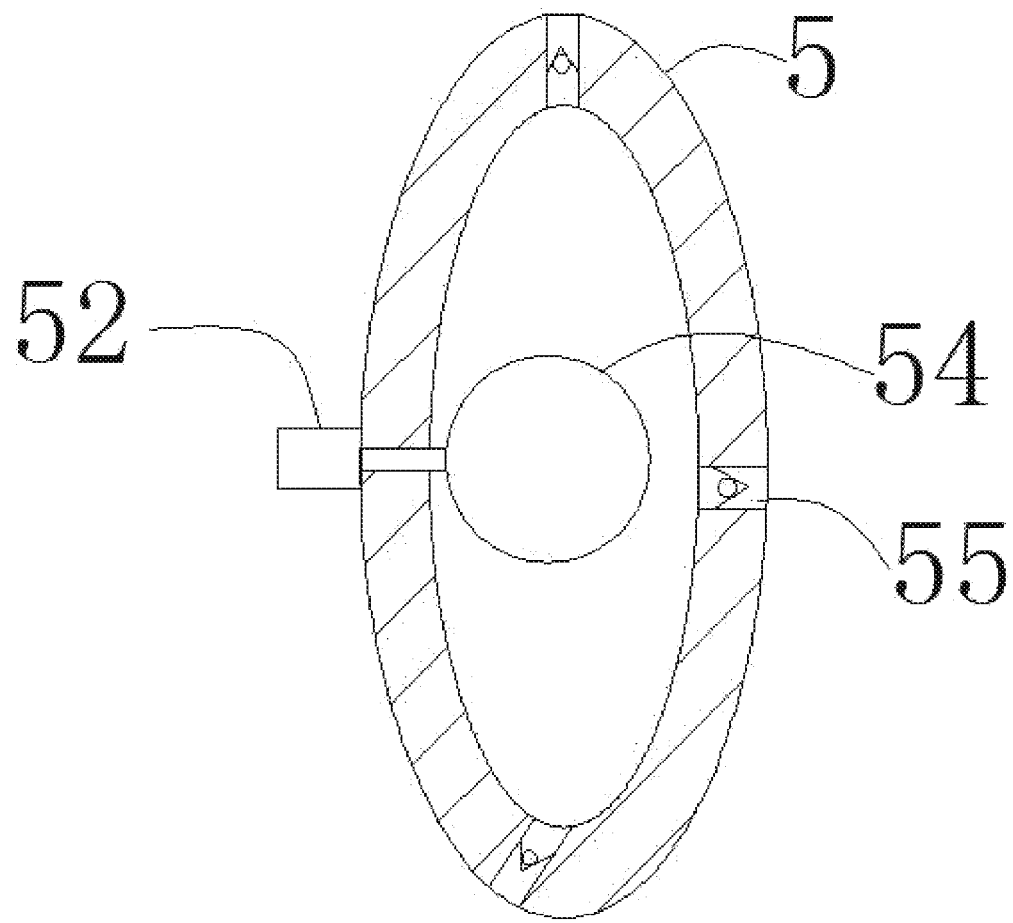
FIG. 5 is a schematic diagram illustrating a sectional structure of a lubricating ball according to some embodiments of the present disclosure.

FIG. 5 is a schematic diagram illustrating a sectional structure of a lubricating ball according to some embodiments of the present disclosure.

In some embodiments, the lubricating ball 5 is in an oval structure.

In some embodiments, the outer wall of the lubricating ball 5 is connected to an air pump 52, an airbag 54 is disposed on the interior of the lubricating ball 5, the airbag 54 is connected to the air pump 52, and the interior of the lubricating ball 5 is filled with the lubricating fluid.

In some embodiments, as shown in FIG. 5, the outer wall of the lubricating ball 5 is provided with discharge holes 55, an one-way valve is disposed in each of the discharge holes 55, and each of the discharge holes 55 is connected to each of the connecting tubes 51.

In some embodiments, the airbag 54 is connected to an air outlet of the air pump 52 through a plastic tube, and the plastic tube runs through the inner wall of the lubricating ball 5, as shown in FIG. 5. In some embodiments, the airbag 54 may also be connected to the air outlet of the air pump 52 through a pipeline of any feasible material.

In some embodiments, the count of the discharge holes 55 and the count of the connecting tubes 51 may be the same, i.e., one-to-one. In some embodiments, the count of the connecting tubes 51 is the same as the count of the connecting holes 112.

In some embodiments, by providing the one-way valve, lubricating is achieved only under the action of pressure, thereby preventing the internal lubricating fluid from overflowing due to a centrifugal force generated by the rotation of the paddle hub 1.

One embodiment of the present disclosure provides a method for independently pitching of a wind turbine with good lubricating performance, including: driving the pinion gear using the pitch motor, such that the large gear meshed with the pinion gear to drive the bearing inner ring to rotate to drive the paddle of the wind turbine connected to the outer side of the bearing inner ring, the bearing inner ring is fixedly connected to the root of the paddle of the wind turbine through the screw holes and the bolts to realize the independent pitch of the wind turbine, inflating and pressurizing, using an air pump, an airbag to discharge a lubricating fluid from an interior of a lubricating ball through discharge holes and connecting tubes, and the lubricating fluid flowing into the annular flow chamber through the connecting holes, and flowing, through the seepage holes, into the rotational gap between the bearing outer ring and the bearing inner ring to realize lubricating and cooling, thus reducing wear and prolonging service life.

In some embodiments, the dust-proof net and the waterproof breathable membrane included by the heat dissipation holes facilitate timely export of the heat generated by the pitch motor, while also preventing rainwater from entering the paddle hub, thereby preventing adverse effects on the electrical equipment inside the paddle motor.

Embodiments of the present disclosure provide a device for independently pitching of a wind turbine, including: the paddle hub 1, the heat dissipation holes 2, the pitch motor 4, and the lubricating ball 5, wherein the outer side of the paddle hub 1 is connected to the wind turbine main shaft 3, and the outer side of the paddle hub 1 is connected to the paddles of the wind turbine. The outer wall of the paddle hub 1 is provided with the bearing inner ring 12, and the outer side of the bearing inner ring 12 is rotationally connected to the bearing outer ring 11, and the inner side of the bearing inner ring 12 is provided with the second gear 121, the inner side wall of the interior of the bearing outer ring 11 is provided with the connecting holes 112, and the interior of the bearing outer ring 11 is provided with the annular flow chamber 111 communicated with the connecting holes 112. The heat dissipation holes 2 are opened in the outer wall of the paddle hub 1. The pitch motor 4 is disposed on the inner side of the paddle hub 1, the output shaft end of the pitch motor 4 is connected to the first gear 42, and the first gear 42 meshes in the inner gear ring of the second gear 121. The lubricating ball 5 is disposed on the inner side of the paddle hub 1, and the outer wall of the lubricating ball 5 is connected to the air pump 52, the airbag 54 is disposed on the interior of the lubricating ball 5, the airbag 54 is connected to the air pump 52, and the interior of the lubricating ball 5 is filled with the lubricating fluid, and the lubricating ball 5 is connected to the connecting holes 112 through the outer end of the connecting tubes 51.

In some embodiments, the inner side wall of the bearing outer ring may also be referred to as the inner side of the bearing outer ring.

In some embodiments, the interior of each of the heat dissipation holes 2 is provided with the dust-proof net 21, and the dust-proof net 21 is provided with inner and outer layers, and the waterproof breathable membrane 22 is disposed between the dust-proof net 21.

In some embodiments, the bearing outer ring 11 is fixedly connected to the outer wall of the paddle hub 1, and the interior of the bearing outer ring 11 is provided with the seepage holes 113 located on the inner side of the annular flow chamber 111, and the seepage holes 113 are communicated with the annular flow chamber 111.

In some embodiments, the pitch motor 4 is connected to the inner side of the paddle hub 1 through the fixing bracket 41, and there are three pitch motors 4 and three second gears 121 connected to the three pitch motors 4, respectively.

In some embodiments, the lubricating ball 5 is in an oval structure, and the lubricating ball 5 is connected to the inner side of the paddle hub 1 through the fixing rod 53, and the lubricating ball 5 is staggered in position with the pitch motor 4.

In some embodiments, the outer wall of the lubricating ball 5 is provided with the discharge holes 55, and the one-way valve is disposed in each of the discharge holes 55, and each of the discharge holes 55 is connected to each of the connecting tubes 51.

In some embodiments, the airbag 54 is connected to the air outlet of the air pump 52 through the plastic tube, and the plastic tube runs through the inner wall of the lubricating ball 5.

Beneficial effects brought by the embodiments of the present disclosure include, but are not limited to: (1) by driving the first gear using the pitch motor, the second gear meshed with the first gear drives the bearing inner ring to rotate to drive the paddle of the wind turbine connected to the outer side of the bearing inner ring, the bearing inner ring is fixedly connected to the root of the paddle of the wind turbine, so as to realize the effect for independently pitching of the wind turbine, and to realize synchronized pitching, or to adjust the angle of one paddle individually. (2) Using the dust-proof net and the waterproof breathable membrane (made of polypropylene, etc.) included in the heat dissipation holes, the heat generated by the pitch motor can be easily exported in a timely manner, while at the same time preventing rainwater from entering the paddle hub, thereby preventing adverse effects on the electrical equipment inside the paddle motor. (3) by inflating and pressurizing, using the air pump, the airbag to increase the volume of the airbag inside the lubricating ball, the lubricating fluid is discharged from the interior of the lubricating ball through the discharge holes and the connecting tubes, and the lubricating fluid flows into the annular flow chamber through the connecting holes, and flows, through the seepage holes, into the rotational gap between the bearing outer ring and the bearing inner ring, which achieves lubricating while also providing a cooling effect, thereby reducing wear and extending the service life. (4) The independent pitch device of the wind turbine can effectively resolve the issues of poor heat dissipation of the pitch motor and the inconvenience of lubricating the internal transmission gears in the existing independent pitch control device of the wind turbine, facilitating the improvement of the heat dissipation efficiency of the pitch motor and lubricating and cooling the gear transmission parts to prolong service life.

It should be noted that the beneficial effects produced by different embodiments can vary, and the beneficial effects in different embodiments may be any one or a combination of the above mentioned, or any other potential beneficial effects can be achieved.

The foregoing is only a preferred embodiment of the present disclosure, and is not intended to limit the present disclosure. Notwithstanding the detailed description of the present disclosure with reference to the foregoing embodiments, it is still possible for a person skilled in the art to modify or make equivalent substitutions of some of the technical features recorded in the foregoing embodiments. Any modifications, equivalent substitutions, improvements, etc., made within the spirit and principles of the present disclosure shall be included in the scope of protection of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for independently pitching of a wind turbine, comprising:

driving a first gear using a pitch motor, such that a second gear meshed with the first gear drives a bearing inner ring to rotate to drive a paddle of a wind turbine connected to an outer side of the bearing inner ring, the bearing inner ring being connected to a root of the paddle of the wind turbine;

inflating and pressurizing, using an air pump, an airbag, to cause the airbag to increase in volume inside a lubricating ball, to discharge a lubricating fluid from an interior of the lubricating ball through discharge holes and connecting tubes;

the lubricating fluid flowing into an annular flow chamber through connecting holes, and flowing, through seepage holes, into a rotational gap between a bearing outer ring and the bearing inner ring, wherein the annular flow chamber is an annular structure for the lubricating fluid to flow, and the annular flow chamber is located in an interior of the bearing outer ring; and dissipating heat generated by the pitch motor through a dust-proof net and a waterproof breathable membrane included in heat dissipation holes.

2. The method of claim 1, wherein the bearing inner ring being connected to a root of the paddle of the wind turbine includes: the bearing inner ring is connected to the root of the paddle of the wind turbine through screw holes and bolts.

3. The method of claim 1, wherein the seepage holes are aperture structures that allow the lubricating fluid to flow from the annular flow chamber to a region between the bearing outer ring and the bearing inner ring.

4. A device for independently pitching of a wind turbine, comprising: a paddle hub, heat dissipation holes, a pitch motor, and a lubricating ball, wherein an outer side of the paddle hub is connected to a wind turbine main shaft, and the outer side of the paddle hub is connected to paddles of the wind turbine;

the outer side of the paddle hub is provided with a bearing inner ring, and an outer side of the bearing inner ring is rotationally connected to a bearing outer ring, an inner side of the bearing inner ring is provided with a second gear, an inner side of the bearing outer ring is provided with connecting holes, an interior of the bearing outer ring is provided with an annular flow chamber communicated with the connecting holes, and the annular flow chamber is an annular structure for the lubricating fluid to flow;

the heat dissipation holes are opened in the outer side of the paddle hub an interior of each of the heat dissipation holes is provided with a dust-proof net, the dust-proof net is provided with inner and outer layers, and a waterproof breathable membrane is disposed between the inner and outer layers of the dust-proof net;

the pitch motor is disposed on an inner side of the paddle hub, an output shaft end of the pitch motor is connected to a first gear, and the first gear meshes in an inner gear ring of the second gear; and the lubricating ball is disposed on the inner side of the paddle hub, and an outer wall of the lubricating ball is connected to an air pump, an airbag is disposed on an interior of the lubricating ball, the airbag is connected to the air pump, and the interior of the lubricating ball is filled with a lubricating fluid, and the lubricating ball is connected to the connecting holes through an outer end of connecting tubes.

5. The device of claim 4, wherein the bearing outer ring is connected to the outer side of the paddle hub, and the interior of the bearing outer ring is provided with seepage holes located on an inner side of the annular flow chamber, and the seepage holes are communicated with the annular flow chamber.

6. The device of claim 4, wherein the pitch motor is connected to the inner side of the paddle hub through a fixing bracket.

7. The device of claim 6, comprising three pitch motors and three second gears connected to the three pitch motors in total, respectively.

8. The device of claim 4, wherein the lubricating ball is connected to the inner side of the paddle hub through a fixing rod, and the lubricating ball is staggered in position with the pitch motor.

9. The device of claim 8, wherein the lubricating ball is in an oval structure.

10. The device of claim 4, wherein the outer wall of the lubricating ball is provided with discharge holes, an one-way valve is disposed in each of the discharge holes, and each of the discharge holes is connected to each of the connecting tubes.

11. The device of claim 4, wherein the airbag is connected to an air outlet of the air pump through a plastic tube, and the plastic tube runs through an inner wall of the lubricating ball.

12. The device of claim 4, wherein the waterproof breathable membrane is a polypropylene material.

13. The device of claim 4, wherein the dust-proof net is made of heat-resistant grade ABS resin and nylon fiber synthetic resin.

* * * * *